May 4, 1954
R. J. MOON
2,677,772
NEUTRON THERMOMETER
Filed Aug. 15, 1946
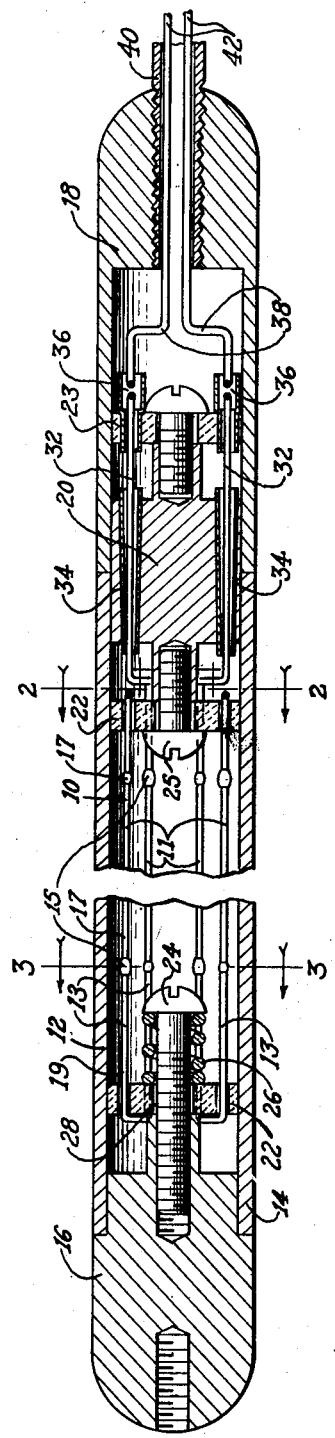
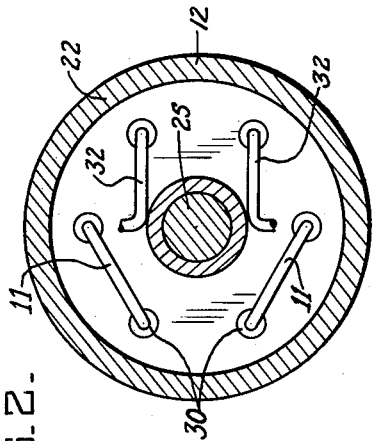
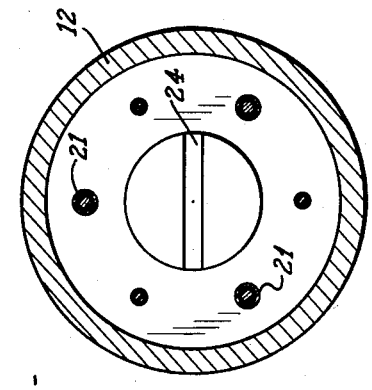
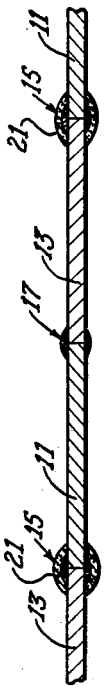
Inventor:
Robert J. Moon
By: *[signature]*
Attorney.

Patented May 4, 1954

2,677,772

UNITED STATES PATENT OFFICE 2,677,772

NEUTRON THERMOMETER

Robert J. Moon, Chicago, Ill., assignor to the United States of America as represented by the United States Atomic Energy Commission Application August 15, 1946, Serial No. 690,801

7 Claims. (Cl. 250—83)

The present invention relates to a neutron responsive device, and particularly to a neutron thermometer adapted for use in connection with the operation and control of neutronic reactor systems.

A neutronic chain reactor, as the term is used herein, constitutes a complete system designed for initiating and carrying out controlled nuclear chain reactions The power derived from a reactor is, in general, related proportionally to the neutron flux density which is derived from nuclear fission.

The neutron thermometer depends for its operation on the nuclear transmutation of energy by materials of high neutron capture cross section, for example, the transmutation of boron to lithium with an alpha emission of approximately 2 m. e. v., where the energy of the alpha emission remains almost entirely within the said bombarded medium which may encase thermocouple elements. In this manner, the neutron thermometer may utilize the dissipation of the energy of the alpha emission as heat, and transform said energy into thermoelectric power by means of a device of thermopile design.

As a principal object of the invention, it is intended to provide a neutron flux indicating device, simple and compact in structure, which is capable of giving and reproducing accurate and continuous indications of neutron flux density within or adjacent to a neutronic reactor.

It is a further object of the invention to provide a neutron density indicating device having sufficient range and sensitivity for the measurement of high intensity neutron flux densities as well as low intensity neutron flux densities.

Another object of the invention is to design a neutron thermometer wherein the time for response of the thermometer to changes of neutron flux density are of minimum order, and substantially independent of the neutron flux density.

A further object of the invention is to design a neutron thermometer which is simple and compact in construction, so as to be portable and allow the device to be inserted in and withdrawn from a neutronic reactor from the purpose of mechanically scanning and traversing the operative power levels of the neutronic system. The construction of said device is of such design as to be temperature compensating and to dispose of and eliminate the spurious potentials introduced by changes in the ambient temperature.

In order to measure neutron flux density, the present invention comprises a temperature measuring means whereby the response is amplified by incorporating the thermopile construction of thermocouples. The neutron thermometer includes a structure of a plurality of hot and cold junctions arranged in such proximity so as to compensate for the ambient temperature deviations which produce spurious voltages, since said voltages are deleterious in the attainment of accurate neutron flux measurements. The means for producing heat at the hot junctions of the thermopile is a coating of a material of high neutron capture cross section encasing the hot junction of the thermocouples. In accordance with the present invention, high thermal conductivity between the neutron capture coating and the thermocouple elements is provided so as to realize the maximum heat transfer, whereas in the prior art such neutron capture coatings have been incorporated with heat insulating binders so as to reduce the efficiency of thermal conduction.

As will hereinafter appear, these objects are accomplished by the provision of a thermocouple or a thermopile device that is temperature responsive to neutron irradiation to produce thermo-electromotive forces proportional to the density of radiation. The various novel structural and constructional arrangements contributing to the successful operation of the apparatus of the invention and a more complete exposition of its principles and mannner of operation will be found in the following description and the accompanying drawings of certain preferred embodiments thereof. In the drawings:

Fig. 1 is a more or less diagrammatic, longitudinal sectional view of a neutron thermometer embodying the present invention;

Fig. 2 is an enlarged sectional view taken on the line 2—2 of Fig. 1;

Fig. 3 is an enlarged sectional view taken on the line 3—3 of Fig. 1; and

Fig. 4 is a longitudinal sectional view of a thermopile segment showing the relative positions of the cold junctions and the encased hot junctions in the thermopile assembly.

The relative disposition of the parts of the device of a coated hot junction type is best illustrated in Fig. 1. Since the thermo-electric power produced by a single thermocouple is relatively of small magnitude, it is desirable, in many instances, to employ a thermopile assembly 10, rather than a single thermocouple, said assembly 10 being illustrated in the figures.

This device includes a case 12 preferably in the form of a hollow metallic tube having at one end a metallic plug insert 16, which is undercut and inserted into said tube and secured thereto as at 14. The opposite end of the hollow tube is closed and capped by means of a metallic cap 18, which is connected to the tube or case 12 by means of a metallic insert 20. In the present invention, the metallic case 12 functions to insure equipotential thermal surface so as to reduce the effect of external thermal gradients. Spurious E. M. F.'s are substantially eliminated by the use of the metallic case 12, when the thermopile assembly 10 is moved from regions of high temperature to regions of relatively low temperatures, as encountered in the neutronic reactor system and the ambient surroundings.

The case 12 is preferably constructed of a material, such as relatively pure aluminum, which has the characteristic of relatively high heat conductivity and also has a relatively low neutron capture cross-section, thus affording a neutron permeable case around the thermopile structure hereinafter described in detail.

The thermopile assembly 10 includes two insulating discs 22 which confront each other within the hollow tube 14. One disc 22 is resiliently attached to the plug insert 16 by means of a screw 24 which is inserted through a centrally disposed hole 28 in said disc 22 and is threaded into the insert plug 16, a spring 26 being adjustably compressed between the head of the screw 24 and the plug 16. The confronting disc 22 is rigidly attached to the insert 20 by a screw 25.

The thermopile assembly 10 comprises a plurality of thermocouples electrically connected in series and supported by said discs 22. Each of the individual thermocouple elements making up the thermopile assembly 10 is comprised of two lengths 11 and 13 of relatively fine wire of dissimilar composition butt welded together into a continuous strand so as to provide a series of alternately arranged hot junctions 15 and cold junctions 17 extending between the confronting discs 22. In the particular embodiment illustrated, the outer dimension of the tube 14 has a diameter of about .475 inch, an inside diameter of .360 inch and length of about 6½ inches. The thermocouple wires 11 and 13 have a diameter of approximately 0.013 inch and a length of about .470 inch. The wires 11 and 13 are butt welded in a nonoxidizing atmosphere, thereby forming a continuous strand of wire. The wires 11 are preferably composed of a nickel-chromium alloy, i. e., Chromel-P, and the wires 13 are preferably composed of a dissimiliar material such as a nickel-silicon-manganese alloy, i. e., Alumel. Other combinations of dissimilar elements 11 and 13 which have relatively high thermoelectric power can be used in a similar manner.

The hot junctions 15 of the thermopile assembly 10 are preferably coated with boron produced by the thermal decomposition of diborane to produce a boron coating 21 on the hot junction 15.

The continuous wire formed of the alternately arranged wires 11 and 13 is threaded or interlaced through openings 30 in the discs 22 and extends back and forth therebetween to form a plurality of substantially parallel segments 19 so arranged that the hot junctions 15 and the cold junctions 17 of adjacent segments are symmetrically disposed in juxtaposition, whereby each hot junction of each segment is disposed in an isothermal plane at right angles to the thermopile major axis and passing through the corresponding cold junctions of the adjacent segments, as best seen in Fig. 3.

This arrangement of the hot junctions 15 and the cold junctions 17 tends to eliminate the spurious E. M. F.'s produced by the unsymmetrical flow of heat from the thermopile assembly, as in devices known in the prior art.

The two terminal end leads 32 of the thermopile assembly 10 extend through tubular quartz insulators 34 extending through an associated insulating disc 23 and the metallic insert 20, said terminal end leads 32 being connected permanently to binding posts 36. The end cap 18 is threaded so that a probing metallic tube 40 can be easily attached to the neutron thermometer for the purpose of scanning the internal structure of the neutronic reactor. The probing metallic tube 40 is of small diameter and long length, whereby the lead-in wires 42 of insulated copper or aluminum wire are threaded through the probing metallic tube 40 so as to connect electrically the thermopile terminal end leads 32 and the binding posts 36 to an external voltage indicating device such as a recording potentiometer or galvanometer.

The thermopile construction described in the foregoing constitutes an efficient neutron flux density indicating means. Due to the rather large number of thermocouples used, sufficient thermo-electric power is produced even at a low neutron density to give reliably reproducible indications. Further, the response characteristic of the thermocouple construction disclosed approximates linearity; and due to the very low heat capacity of the thermopile elements and supports, the response is practically instantaneous throughout the operative range of the device. In addition, the low thermal capacity of the thermopile assembly 10, in combination with the insulating discs 22, which suspends both hot junctions 15 and cold junctions 17, in air, serves to greatly minimize the time lag in restoring the device to operative condition following rapid changes in neutron flux density. In fact, operation of such devices has shown that under the most severe conditions likely to be encountered, the time lag in order to restore the device to its normal operating level will be in the order of a fraction of a second. Extended use of the device indicates that there is substantially no deterioration of the materials of which it is constructed or changes in calibration over a considerable period of time.

It may be noted that spurious voltages induced by varying magnetic fields are substantially eliminated in the novel device which embodies non-inductive windings because said windings possess negligible self-inductance and are substantially resistive. According to the present invention, each segment is interlaced in such a manner so that the induced E. M. F.'s are substantially neutralized, thereby eliminating coupling within the circuit.

The above-described neutron thermometer, as a device for monitoring the neutronic reactor at a fixed position, is sufficiently compact and portable so that the device can be moved through the reactor to measure the distribution of neutron flux density during operation of the reactor.

In the foregoing, I have described how thermocouple devices of certain particular constructional arrangements will be used to indicate neutron flux density. It will be apparent that various other structural arrangements, not necessarily embodying the particular details of the embodiments disclosed, may be constructed and, accordingly, it is my intention that the accompanying claims shall be accorded the broadest possible construction, consistent with the language appearing therein and in the prior art.

What is claimed is:

1. A neutron thermometer comprising a thermopile in the form of a continuous strand containing a plurality of alternately arranged hot and cold junctions, said strand being wound into a plurality of substantially parallel segments so arranged that the hot junctions of each segment is disposed closely adjacent to the corresponding cold junctions of the adjacent segment, the hot junctions of said thermopile being coated with a material having a high neutron capture cross section.

2. A device of the class described comprising a continuous strand non-inductively wound to form substantially parallel segments, said strand being formed of a plurality of alternately arranged thermocouple elements of dissimilar elements joined end to end and capable of developing thermo-electric power at the junctions therebetween, the hot junctions of said thermocouple being coated with a material having a high neutron capture cross section.

3. A device of the class described comprising a continuous strand non-inductively wound to form a plurality of substantially parallel segments, said strand being formed of a plurality of alternately arranged thermocouple elements of dissimilar materials joined end to end in alternate hot and cold junctions, the hot junctions being encased with neutron absorbent material, each hot junction of each segment being disposed in a plane perpendicular to the longitudinal axis of the device passing through the corresponding cold junctions of the adjacent segments.

4. A neutron indicating means comprising a plurality of thermocouple elements of dissimilar materials capable of developing thermo-electric power at the junctions thereof, said elements being joined end to end thereby forming alternate hot and cold junctions, the hot junctions of said thermopile being coated with a material having a high neutron capture cross section, said structure arranged between a pair of spaced insulating discs operatively arranged so that the cold junction of each segment and the corresponding hot junction of adjacent segments is in the same isothermal plane at right angles to the thermopile major axis, the continuous wire formed of said thermocouple elements being interlaced through said insulating discs a plurality of times and the unconnected ends of said continuous wire extending through one of said discs, whereby associated lead-in connectors may be connected to said ends at one extremity of the device.

5. A device of the class described comprising a pair of insulating members and a continuous wire extending back and forth between said members a plurality of times to afford a plurality of substantially parallel segments extending in substantially straight lines between said members, said wire being formed of a plurality of alternate elements of dissimliar materials joined together thereby forming alternate hot and cold junctions, said hot junctions being encased with materials of high neutron capture cross section.

6. A device of the class described comprising a pair of insulating members and a continuous wire extending back and forth between said members a plurality of times to afford a plurality of substantially parallel segments extending in substantially straight lines between said members, said wire being formed of a plurality of alternate elements of dissimilar materials joined together thereby forming alternate hot and cold junctions, said hot junctions being encased in boron.

7. A device of the class described comprising a pair of discs constructed of electrically insulating material and a continuous wire extending back and forth between said discs a plurality of times to afford a plurality of substantially straight lines between said discs, said wire being formed of alternate nickel-chromium alloy segments and nickel-silicon-manganese alloy segments joined end to end thereby forming alternate hot and cold junctions, said hot junctions being encased with material of high neutron capture cross section.

References Cited in the file of this patent

UNITED STATES PATENTS

| Number | Name | Date |
| --- | --- | --- |
| 1,081,365 | Coblentz | Dec. 16, 1913 |
| 2,579,994 | Zinn | Dec. 25, 1951 |

FOREIGN PATENTS

| Number | Country | Date |
| --- | --- | --- |
| 213,868 | Great Britain | Apr. 4, 1924 |